Figure 1:
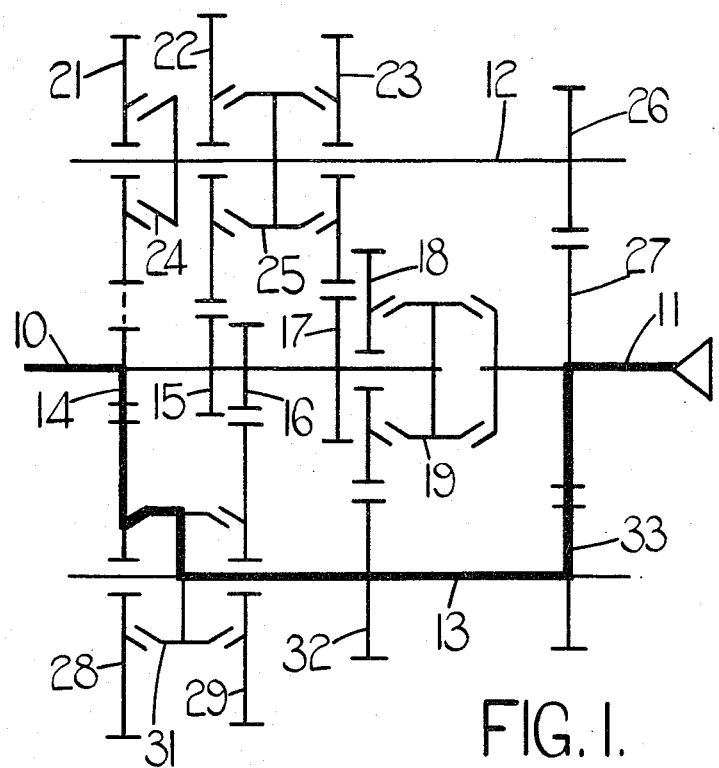

United States Patent [19]

Morrison

[11] 4,106,358
[45] Aug. 15, 1978

[54] GEAR BOXES

[75] Inventor: William McKenzie Meek Morrison, Wolverhampton, England

[73] Assignee: Turner Manufacturing Company, Ltd., England

[21] Appl. No.: 693,476

[22] Filed: Jun. 7, 1976

Related U.S. Application Data

[63] Continuation of Ser. No. 340,282, Mar. 12, 1973, abandoned.

[30] Foreign Application Priority Data

Mar. 17, 1972 [GB] United Kingdom ............... 12533/72

[51] Int. Cl.² .............................................. F16H 3/08
[52] U.S. Cl. ........................................ 74/331; 74/359; 74/360
[58] Field of Search ............... 74/325, 329, 331, 359, 74/360, 333, 340

[56] References Cited

U.S. PATENT DOCUMENTS

| Re. 25,458 | 10/1963 | Barth et al. | 74/331 |
| 2,072,057 | 2/1937 | Rauen | 74/329 X |
| 2,246,636 | 6/1941 | Peterson et al. | 74/333 |
| 2,280,683 | 4/1942 | Bedford | 74/331 X |
| 2,310,310 | 2/1943 | Peterson et al. | 74/333 |
| 2,612,787 | 10/1952 | Youngren et al. | 74/331 X |
| 2,972,899 | 2/1961 | Wiggerman | 74/329 |
| 3,105,395 | 10/1963 | Perkins | 74/33 X |
| 3,318,167 | 5/1967 | Frost | 74/331 |
| 3,645,153 | 2/1972 | Northcraft | 180/70 X |

FOREIGN PATENT DOCUMENTS

| 1,059,777 | 6/1959 | Fed. Rep. of Germany | 74/360 |
| 2,137,440 | 2/1972 | Fed. Rep. of Germany | 74/331 |

*Primary Examiner*—Benjamin W. Wyche
*Assistant Examiner*—Carl F. Piotruszka

[57] ABSTRACT

A gear box having an input shaft and an output shaft which are coaxial and two lay shafts parallel to and spaced from the input shaft, the lay shafts having respective gears fixed to them, said gears engaging with a gear fixed to the output shaft and the lay shafts carrying gears which mesh with respective gears which are non rotatably carried on the input shaft, the said meshing input and lay shaft gears providing respective ratios through which torque is transmitted from the input shaft to either one of the lay shafts, through the appropriate permanently meshing gears to the output shaft and clutch means for selectively engaging the gears on the lay shafts with said shafts.

1 Claim, 8 Drawing Figures

GEAR BOXES

This is a continuation of application Ser. No. 340,282 filed Mar. 12, 1973 now abandoned.

This invention relates to gear boxes providing a plurality of alternative speed ratios between input and output shafts.

In gear boxes providing a large number of alternative ratios, for example, five or six, the usual arrangement of input and coaxial output shafts and a lay shaft side by side is satisfactory in operation, but renders the box unduly long.

The object of this invention is to provide an improved form of gear box in which a large number of ratios does not necessitate an unduly long gear box.

In accordance with the present invention a gear box comprises an input shaft, a coaxial and relatively rotatable output shaft, two spaced lay shafts having fixed thereto respective gears permanently in mesh with a gear fixed on the output shaft, one or more gears rotatably carried on each of the lay shafts, and gears non-rotatably carried on the input shaft, and meshing with the lay shaft gears respectively, and means for selectively connecting the lay shafts with the or each one of said gears carried thereon, to transmit torque from the input shaft through said gears to one of the lay shafts and thence through the permanently meshing gears to the output shaft.

Figure 5:
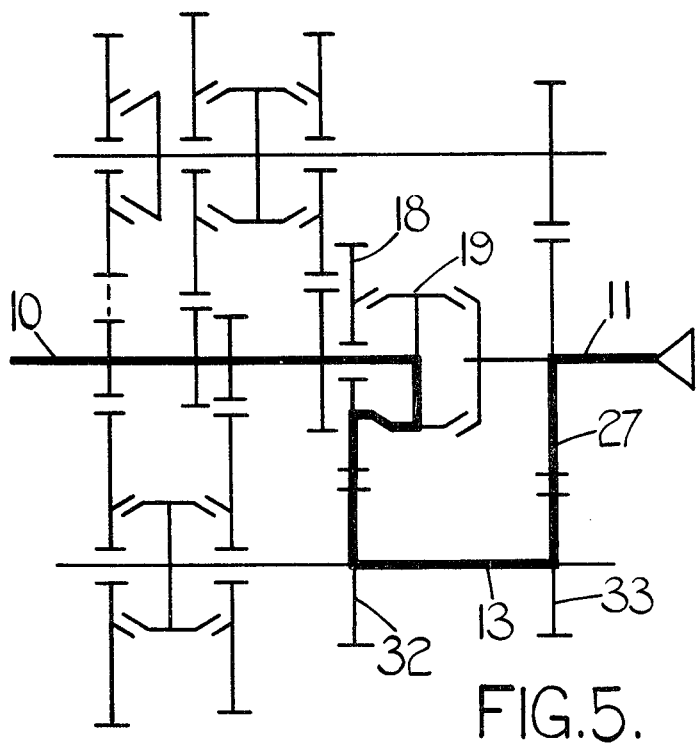
Figure 6:
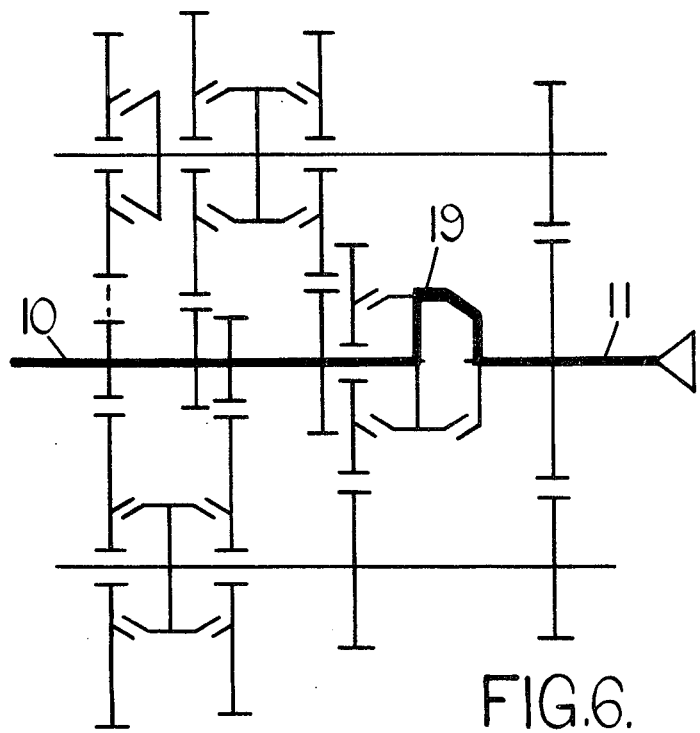
Figure 7:
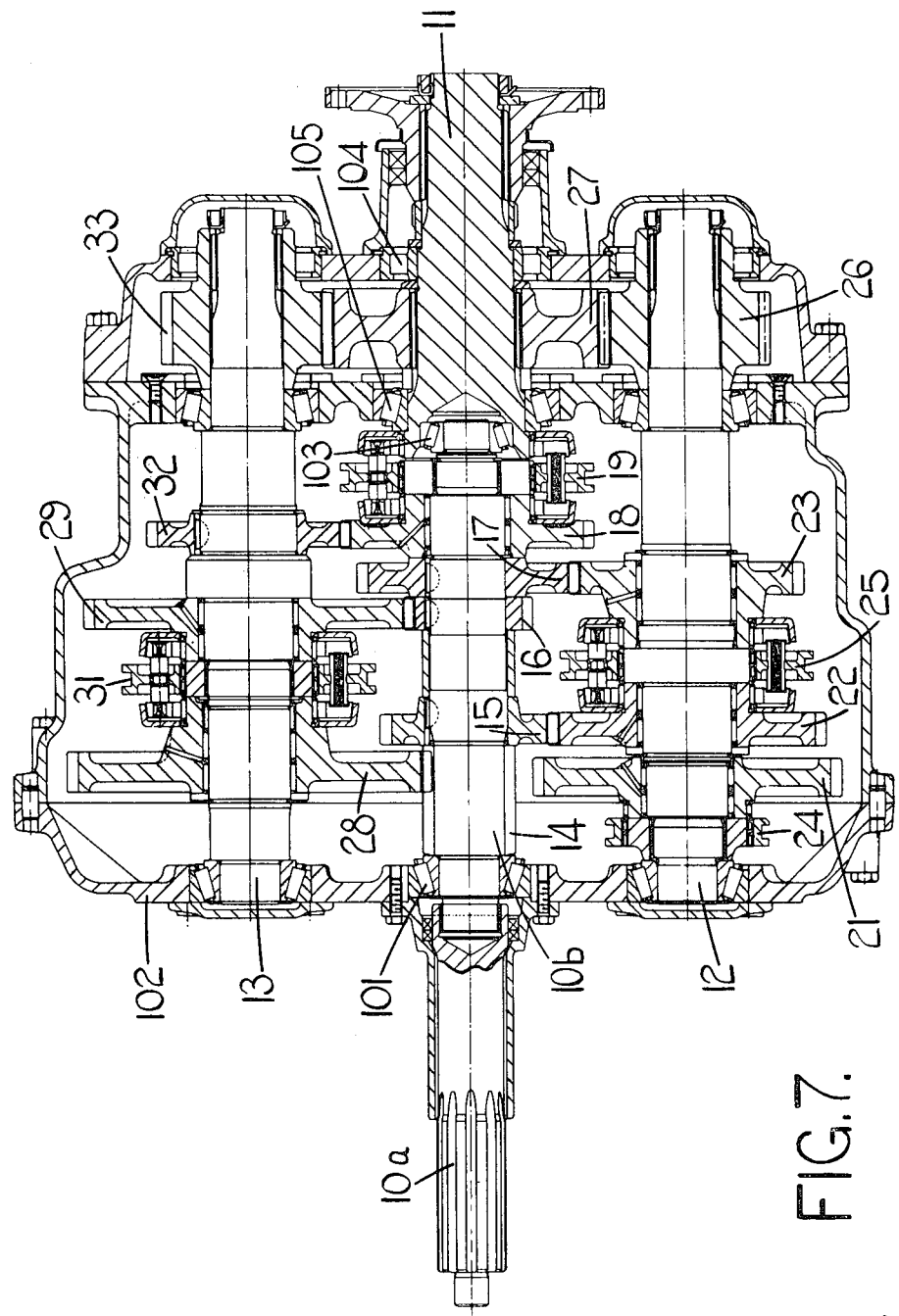
Figure 8:
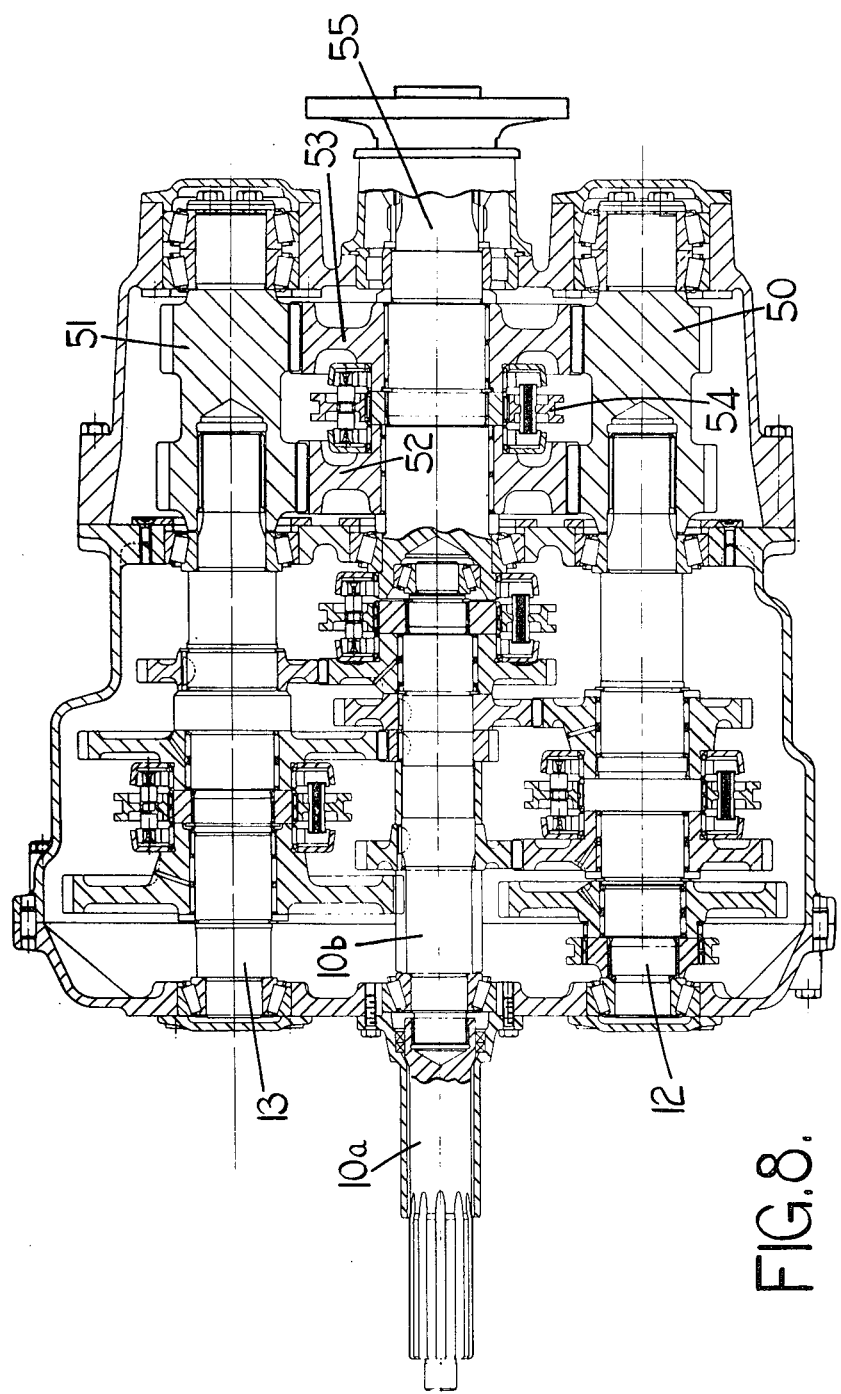

The invention will now be described by way of example with reference to the accompanying drawings in which FIGS. 1 to 6 are respective diagrammatic representations of a gear box with six forward speeds, for a vehicle transmission in the six forward speed ratio positions respectively and FIGS. 7 and 8 are cross-sectional views of six and eleven speed gear boxes respectively constructed in accordance with the principles of the present invention.

The six speed gear box of FIGS. 1 to 6 and 7, has an input shaft 10, and a coaxial output 11. The input shaft has two sections 10a, 10b, connected by a spline and its outer end is adapted for connection to a prime mover. The output shaft is adapted for connection to a final drive unit. The input shaft has a bearing 101, in the casing 102, of the gear box and is also supported by the inner end of the output shaft 11, by a further bearing 103. The output shaft is in turn mounted in bearings 104, 105, in the casing 102.

Extending parallel with and at opposite sides of the input and output shafts, are two lay shafts 12 and 13 mounted for rotation in the casing 102 of the gear box. The input shaft has non-rotatably fixed to it, four gears 14, 15, 16 and 17 and there is a further gear 18, rotatably mounted on the input shaft and engageable through a clutch 19, with the shaft. The lay shaft 12, has three gears 21, 22, 23 rotatably mounted upon it and alternatively engageable with that lay shaft, through respective synchroniser clutches 24, and 25. There is also non-rotatably mounted upon the end of the lay shaft 12, nearest to the output end of the gear box, a further gear 26, which is fixed to and permanently in mesh with a gear 27, fixed to the output shaft 11. The other lay shaft 13, has two gears 28, 29 rotatably mounted upon it and alternatively engageable with it through a synchroniser clutch 31. There is also fixed to the lay shaft 13, a gear 32 and another gear 33, which is fixed to and permanently in mesh with the gear 27 on the output shaft 11.

The gears on the input shaft and on the lay shaft are in meshing pairs. The gear 15, on the input shaft is in mesh with the gear 22 on the lay shaft 12 and the gear 17 meshes with the gear 23. Similarly the gear 14 on the input shaft meshes with the gear 28 on the lay shaft 13 and the gear 16 meshes with the gear 29. The gear 18 also meshes with the gear 32.

Three of the synchroniser clutches 19, 25 and 31, are double sided and in the case of the synchroniser clutch 19, this can be used to engage the gear 18 with the input shaft or alternatively to engage the input shaft with the adjacent end of the output shaft.

FIG. 1 illustrates the first gear position wherein drive takes place as indicated by the heavy line from the input shaft 10, through the gear 14, mounted upon it and thus through the gear 28 which meshes with the gear 14. The synchroniser clutch 31 is engaged to transmit drive from the gear 28 to the lay shaft 13 on which it is mounted. The gear 33, on the end of the lay shaft 13 which is in permanent mesh with the fixed gear 27 on the output shaft, transmits the drive to the output shaft 11.

Figure 2:
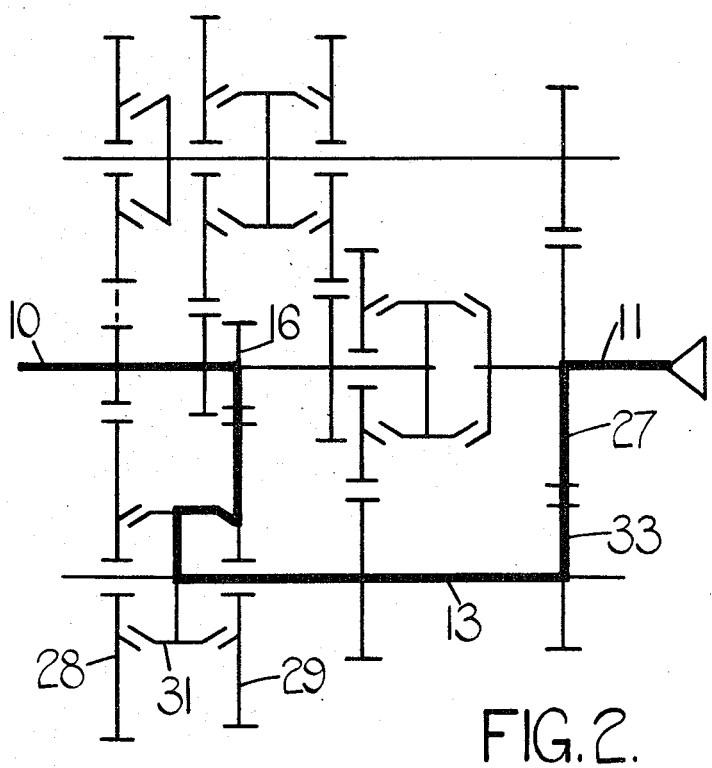

In FIG. 2, the second gear position is illustrated. The synchroniser clutch 31 no longer permits the gear 28 to rotate in unison with the lay shaft 13, but instead locks the gear 29 on to the lay shaft 13. This is in mesh with a gear 16 on the input shaft, so that drive takes place through the gears 16 and 29 and thence through the lay shaft 13, to the output shaft through the permanently meshing fixed gears 33 and 27.

Figure 3:
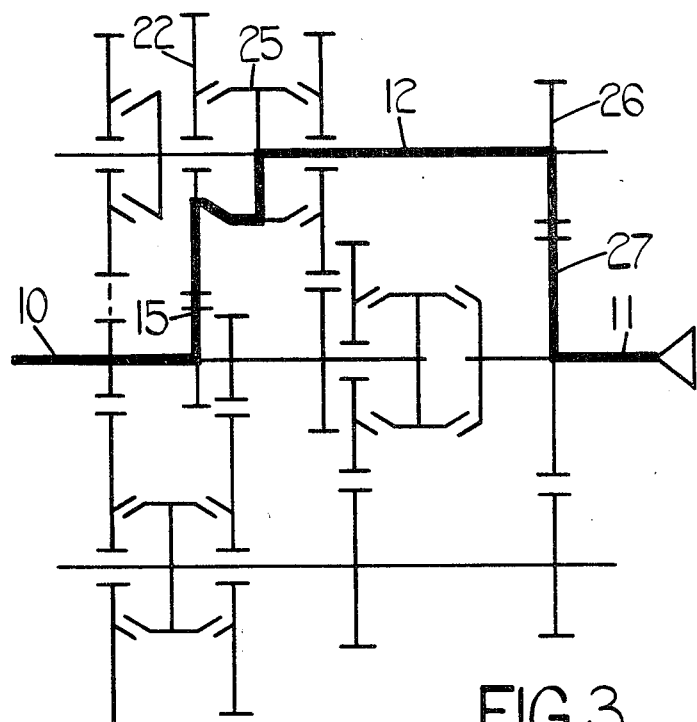

In the FIG. 3, configuration which is the third gear position, the other lay shaft 12 is used to transmit drive from the input shaft 10 to the output shaft 11. The gear 15 on the input shaft meshes with the gear 22 on the lay shaft 12 and the latter is locked to the lay shaft by means of the synchroniser clutch 25. The lay shaft 12, transmits drive to the output shaft through the gear 26, in permanent mesh with the gear 27 on the output shaft 11.

Figure 4:
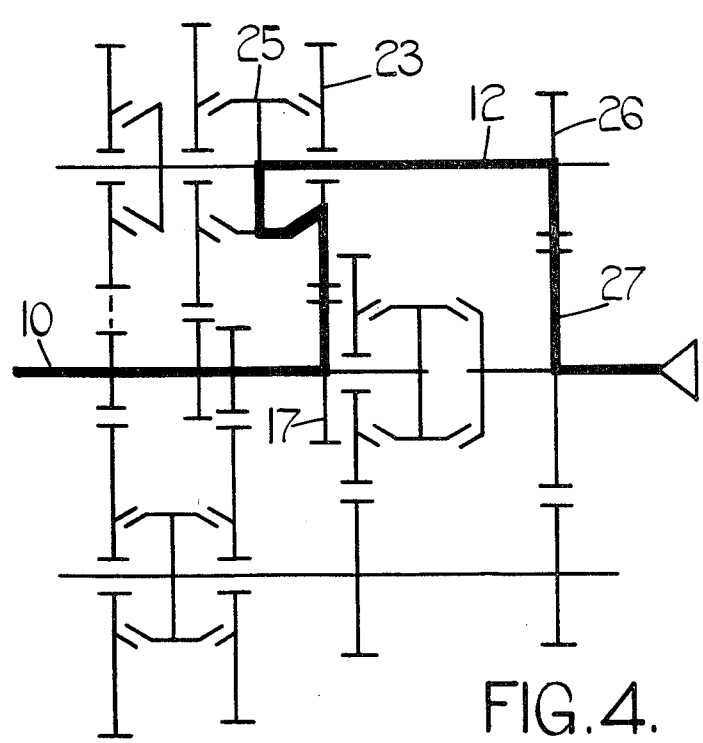

FIG. 4, illustrates the position of the synchroniser clutch 25, wherein it engages the gear 23 with the lay shaft 12 upon which it is mounted and drive thus takes place through the gear 17, fixed on the input shaft 10, through the gear 23 and the lay shaft 12 and thence through the fixed gears 26 and 27.

In FIG. 5, fifth gear position is illustrated. In this position the gear 18, which is rotatably mounted on the input shaft 10, and which is in mesh with the gear 32 on the lay shaft 13 is locked to the input shaft by the synchroniser clutch 19. The lay shaft gear 33 meshing with the output shaft 27 again transmits drive to the output shaft 11.

In FIG. 6, the sixth gear position is illustrated. This is a direct drive and the torque is transmitted from the input shaft through the synchroniser clutch 19 and directly into the output shaft 11.

The synchroniser clutches all incorporate brake ring type synchronising mechanisms so that synchronisation takes place on all gear selections. Furthermore the gear selections are made by means of the synchroniser clutches which are positioned at points of minimum relative speeds between the parts to be synchronised. This is particularly the case where gears are rotatably mounted on the lay shafts. The arrangement minimises torque loadings while gear changes are taking place.

The gear 21 on the lay shaft 12 is intended for use in the reverse gear position. The gear 21 meshes with a gear (not illustrated) which is in turn in mesh with the gear 14 on the input shaft. In order to engage reverse gear, the synchroniser clutch 24 is actuated to lock the gear 21 on the lay shaft 12. Since the gear 21 is rotated by the gear 14, through an intermediate gear, the lay shaft and thus the output shaft 11 will rotate in the opposite direction to that which occurs in the forward speed positions.

FIG. 8 shows an eleven speed gear box which is basically the same as the gear box of FIG. 7 in all essential respects except one. Where the FIG. 7 gear box has, on its lay shafts 12, 13 respective fixed gears 26 and 33 engaging with a single gear 27 fixed on the output shaft 11, the gear box in FIG. 8 has two complete sets of such gears with provision for selecting one or other of such sets.

Thus on the lay shaft 12 there is fixed a double gear 50. The two portions of this have different numbers of teeth. The lay shaft 13 has also a similar double gear 51.

The output shaft 55, instead of having a fixed gear has two different size gears 52, 53 rotatably mounted on it. Between these is a synchroniser clutch 54 arranged for alternative engagement of either of the gears 52 or 53 with the output shaft 55. By means of this arrangement there are two ratios available between the lay shafts and the output shaft. Thus the gear selections between the input shaft gears and the lay shaft gears can be affected in either of two alternative ranges, giving ten possible indirect gears and a direct drive between the input and output shafts, providing an eleventh gear. Many of the components of the two gear boxes shown in FIGS. 7 and 8 respectively are common.

In both the gear boxes illustrated, the two lay shafts 12 and 13 are diametrically opposite positions with respect to the axis of the input and output shafts. Moreover, the two lay shafts and the input and output shafts have their axes lying on a plane which is horizontal when the gear box is in use. This arrangement assists lubrication of all the gears on all the shafts, from a reservoir formed in the bottom of the casing of the gear box.

The principle of this gear box is that the synchroniser clutches are arranged at positions where minimum relative rotation takes place between relatively rotating parts to be engaged, for the purpose of selection of a gear. Moreover, the torque is transmitted through one or other of the lay shafts and through the permanent meshing gears into the output shaft 11.

This arrangement of two lay shafts in side by side parallel relationship has the advantage that the total length of the gear box is minimised despite a relatively large number of gear ratios for selection.

I claim:

1. A gear box comprising a relatively long input shaft, a relatively short output shaft in coaxial relation and operatively connected with said input shaft and relatively rotatable therewith, two spaced lay shafts disposed in parallel relationship with said input and output shafts, a plurality of fixedly mounted input shaft gears on said input shaft, at least one rotatably mounted lay shaft gear disposed on each of said respective lay shafts and permanently meshing with a corresponding one of said fixedly mounted input shaft gears, at least one rotatably mounted input shaft gear on said input shaft, at least one fixedly mounted lay shaft gear disposed on at least one of said lay shafts and permanently meshing with said rotatably mounted input shaft gear, two output shaft gears rotatably mounted on said output shaft, two further fixedly mounted lay shaft gears disposed on each of said respective lay shafts towards one end thereof and each permanently meshing with one of said two output shaft gears, means for alternatively engaging one of said output shaft gears for operative transmission of torque between the two lay shafts and the output shaft;

a synchronizer on said input shaft for engaging said input shaft with said input shaft rotatably mounted gear, at least one further synchronizer on each of said lay shafts for selectively engaging said respective lay shaft with a respective rotatably mounted lay shaft gear, and all forward gears synchronized by synchronizers.

* * * * *